United States Patent
Notovitz et al.

(10) Patent No.: US 7,142,727 B2
(45) Date of Patent: Nov. 28, 2006

(54) NON-ITERATIVE METHOD OF CALCULATING IMAGE SKEW

(75) Inventors: William Notovitz, Marion, NY (US); Stuart Alan Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 952 days.

(21) Appl. No.: 10/321,922

(22) Filed: Dec. 17, 2002

(65) Prior Publication Data

US 2004/0114831 A1 Jun. 17, 2004

(51) Int. Cl.
G06K 9/32 (2006.01)
(52) U.S. Cl. .................. 382/289; 382/282; 382/284; 358/538; 358/540
(58) Field of Classification Search ................ 382/282, 382/284, 289, 296; 358/538, 540, 453
See application file for complete search history.

(56) References Cited

U.S. PATENT DOCUMENTS

| | | | |
|---|---|---|---|
| 4,723,297 A | 2/1988 | Postl | 382/46 |
| 5,001,766 A | 3/1991 | Baird | 382/46 |
| 5,027,227 A * | 6/1991 | Kita | 358/488 |
| 5,187,753 A | 2/1993 | Bloomberg et al. | 382/46 |
| 5,199,101 A | 3/1993 | Cusick et al. | 395/115 |
| 5,335,420 A | 8/1994 | Kling, III et al. | 33/288 |
| 5,359,677 A * | 10/1994 | Katsurada et al. | 382/290 |
| 5,373,371 A * | 12/1994 | Masui | 358/444 |
| 5,452,374 A * | 9/1995 | Cullen et al. | 382/293 |
| 5,506,918 A | 4/1996 | Ishitani | 382/289 |
| 5,528,387 A * | 6/1996 | Kelly et al. | 358/488 |
| 6,985,640 B1 * | 1/2006 | Schweid | 382/289 |

OTHER PUBLICATIONS

Dan S. Bloomberg, Gary E. Kopec and Lakshmi Dasari, "Measuring Document Image Skew and Orientation", SPIE Symposium in Document Recognition II 1995.

Henry S. Baird, "Accurate Skew Estimation and the Top-Down Analysis of Document Images", Dec. 12, 1986.

\* cited by examiner

*Primary Examiner*—Bhavesh M Mehta
*Assistant Examiner*—Wes Tucker
(74) *Attorney, Agent, or Firm*—William Eipert (57) ABSTRACT

A parallel, non-iterative, memory efficient method of determining image skew. A document skew angle is determined from a fast scan second order moment data set and a slow scan second order moment data set. A slow scan second order moment data set can be generated by receiving a current scanline of image data, updating columns sums for a set of rotation angles using scanlines within a buffer comprising a band having a predetermined number B of scanlines, and updating the buffer with the current scanline. A fast scan second order moment data set is generated by projecting a plurality of pixels within each scanline of image data received to a first rotation angle wherein the plurality pixels project onto M rows; updating M memory locations, wherein each one of the M memory locations corresponds to one of the M rows and wherein each memory location is updated using pixels projecting onto the corresponding row whereby one of the M memory locations contains a completed row; and adding the square of the completed row sum to a moment accumulator.

17 Claims, 8 Drawing Sheets

NON-ITERATIVE METHOD OF CALCULATING IMAGE SKEW

CROSS-REFERENCE

Cross reference is made to the related U.S. patent application entitled "Parallel Non-iterative Method of Determining and Correcting Image Skew," to Stuart A Schweid, application Ser. No. 10/040,810 filed Jan. 7, 2002.

FIELD OF THE INVENTION

The present invention relates to the art of image processing. The embodiments disclosed herein find particular application in conjunction with determining and correcting image skew of a digital image, and will be described with particular reference thereto.

BACKGROUND AND SUMMARY

In many image processing applications, it is desirable to determine and correct skew of a document image. For example, many text recognition systems, such as optical character recognition (OCR) systems, fail if presented with text oriented with a skew of more than a few degrees, not to mention if the text is oriented sideways or upside-down. In addition, it is easier to identify text lines and text columns if the image skew is known or the image is deskewed.

A variety of methods for determining image skew using an iterative estimation approach based upon the method disclosed by Baird in U.S. Pat. No. 5,001,766 have been proposed. One such approach involves using bounding boxes of connected components to estimate image skew. The coordinates of a token point, on the bottom center of the bounding box, are selected, and a function $S_{tokens}$ of skew angle is computed from these coordinates. Specifically, the function $S_{tokens}(2)$ is the sum of squares of the number of such points computed along a set of lines with the angle 2 to the raster direction. A vertical shear is simulated on the set of points and the sums over the points with the same y-coordinate are determined. Aside from a constant (independent of 2), the function $S_{tokens}$ is the variance of the number of tokens on a line, as a function of angle. This variance is a maximum in the direction where the tokens for each text line fall near the same line.

Another method for determining skew traverses straight lines of the image at a set of angles relative to the raster direction. A function $S_\delta(\theta)$ is computed that has a maximum value when the scan direction $\theta$ is along the text lines. Unlike the approach described above, which computes tokens from connected components, this method uses every pixel in the image. The function $S_\delta(\theta)$ is similar to the function $S_{tokens}(\theta)$ in the sense that an angle $\theta$ is chosen and pixel sums are found along lines in the image at this angle. However, instead of squaring the sum of tokens, the second method squares the difference between sums of ON pixels on adjacent lines, and the function $S_\delta(\theta)$ is found by summing over all lines. The function $S_\delta(\theta)$ is, aside from a constant, the variance in the difference between pixel sums on adjacent lines at the angle $\theta$.

The deskew methods described above, along with other deskew methods employing an iterative estimation approach based on the teachings of Baird, require a local copy of the image to be stored. Such requirement prevents pipeline processing; while the iterative nature of the methods eliminates the possibility of parallel processing. Therefore, the speed at which an image may be deskewed is necessarily limited.

The teachings disclosed herein propose a method and apparatus for determining and correcting image skew. In particular, there is taught a parallel, non-iterative, memory efficient method of determining image skew. In accordance with an embodiment disclosed herein there is provided a method of determining image skew including scanning a document to produce scanned image data, the scanned image data comprising a plurality of scanlines with each scanline comprising a plurality of pixels; generating a fast scan second order moment data set; generating a slow scan second order moment data set; and determining a document skew angle from the fast scan and slow scan second order moment data sets; wherein the step of generating the slow scan second order moment data set includes receiving a current scanline of image data, updating columns sums for a set of rotation angles using scanlines within a buffer comprising a band of scanlines, the band having a predetermined number B of scanlines, and updating the buffer with the current scanline.

In accordance with another embodiment disclosed herein there is provided a method of determining image skew including scanning a document to produce scanned image data comprising a plurality of scanlines, each scanline having a plurality of pixels; generating a first set of second order moments, the first set of second order moments being based on row sums; generating a second set of second order moments, the second set of second order moments being based on column sums; and determining a document skew angle from the first and second sets of second order moments; wherein the step of generating the first set of second order moments includes receiving a first scanline, projecting a plurality of pixels within the first scanline to a first rotation angle, adding a first subset of the plurality of projected pixels to a first memory location, adding a second subset of the plurality of projected pixels to a second memory location, adding a third subset of the plurality of projected pixels to a third memory location, and adding the square of the pixel sum in the first memory location to a moment accumulator.

In accordance with another embodiment disclosed herein there is provided a method of processing image data to determine image skew, comprising: receiving scanned image data, the scanned image data comprising a plurality of scanlines with each scanline comprising a plurality of pixels; generating a fast scan second order moment data set; generating a slow scan second order moment data set; and determining a document skew angle from the fast scan and slow scan second order moment data sets; wherein the step of generating the fast scan second order moment data set includes projecting a plurality of pixels within a scanline to at least a first rotation angle wherein the plurality pixels project onto M rows; updating M memory locations, wherein each one of the M memory locations corresponds to one of the M rows and wherein each memory location is updated using pixels projecting onto the corresponding row whereby one of the memory locations contains a completed row sum and M−1 of the memory locations contain partial row sums; adding the square of the completed row sum to a moment accumulator; and repeating the projecting, updating and adding steps for each scanline within a plurality of scanlines whereby a memory location having a completed row sum is reused to accumulate subsequent row sum so that only M memory locations are required to accumulate row sums.

BRIEF DESCRIPTION OF THE DRAWINGS

The teachings and embodiments disclosed herein will be described with reference to the accompanying drawings, which are provided for purposes of illustrating various aspects of the teachings and embodiments and are not to be construed as limiting the same, wherein.

DESCRIPTION

For a general understanding of the teachings herein, reference is made to the drawings wherein like reference numerals have been used throughout to designate identical elements. The present description is directed in particular to elements forming part of, or cooperating more directly with a method and apparatus for determining image skew having efficient memory requirements. It is to be understood that elements not specifically shown or described may take various forms well known to those skilled in the art.

Figure 1:
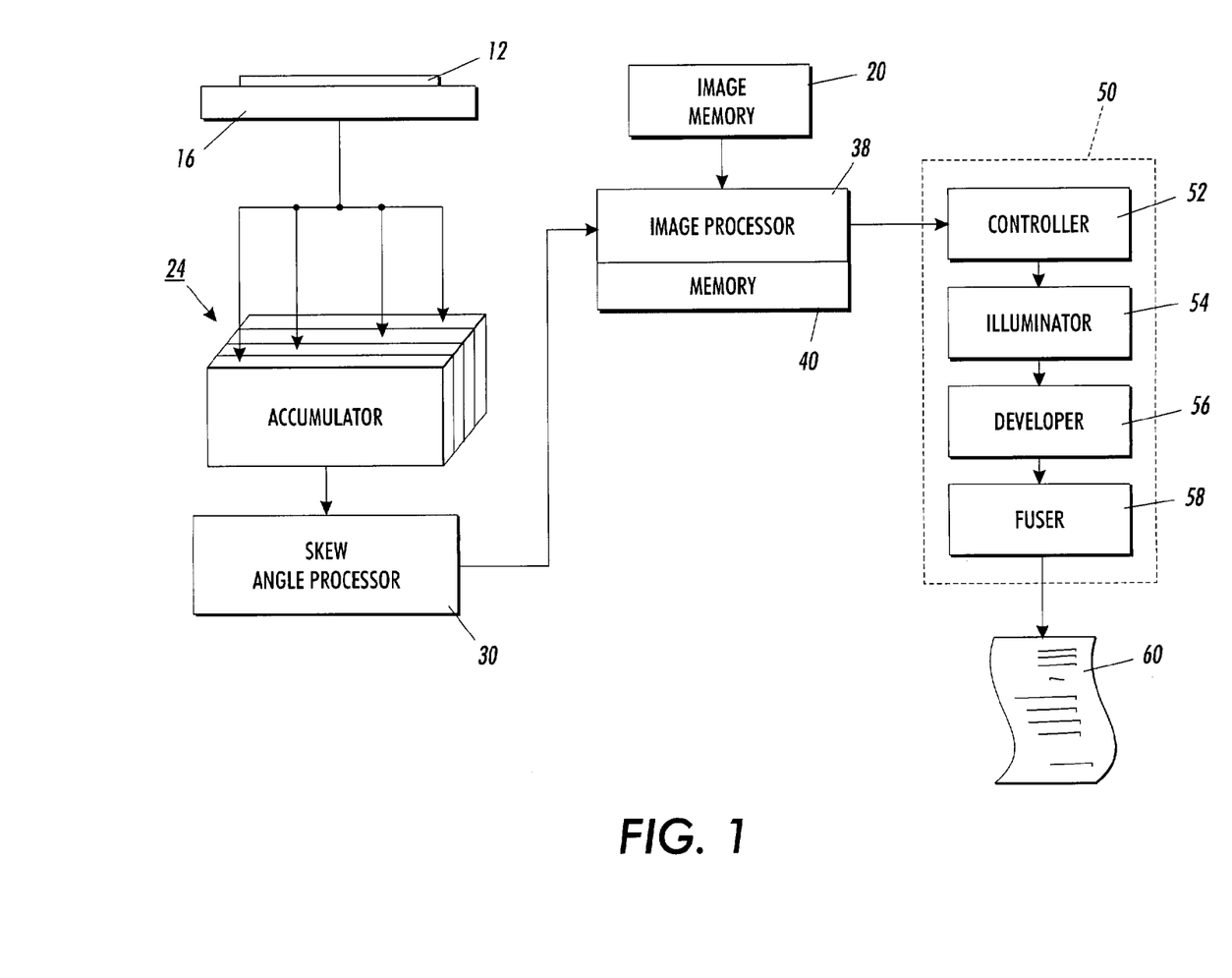
FIG. 1 is a block diagram of an imaging apparatus which may incorporate one or more aspects of the embodiments disclosed herein.

Turning now to FIG. 1, there is shown an imaging apparatus which determines and corrects image skew in a scanned document 12. Image skew refers to rotational error between the dominant orientation of lines of printed objects, such as characters, within a document and a reference line observed by a reader or scanner as being zero rotational error. Scanner 16 scans document 12 in a conventional manner, producing electrical scanned image data, a copy of which is stored in image data memory 20. The scanned image data is represented as a two-dimensional data set (rows and columns) of pixels.

Due to the relative motion between the input device (e.g., the image array, sensor array) of the scanner and the image being scanned, a scanline of data is acquired relatively quickly. Accordingly, the axis of the image set that is parallel to each scanline of data is referred to as the fast scan direction. Conversely, the slow scan direction refers to the direction of the relative movement between the document and the scanning system. This is the mechanical movement that causes the scanning system to generate scanlines of image data. That is, the scanned image data can be said to comprise rows of pixels in the fast scan direction and columns of pixels in the slow scan direction.

In addition to supplying image data to memory 20, scanlines of image data are supplied to accumulator 24. Beneficially, the scanlines of image date supplied to accumulator 24 are comprised of a plurality of binary pixels. That is, each pixel can be considered to be ON or OFF. For example, in an eight bit system with pixel values from 0 (black) to 256 (white), pixels may be defined to be ON if they are black (e.g., below a preselected threshold value) and OFF if they are white (e.g., below a preselected threshold value). In such a system, the threshold may, for example, be set to a predetermined level or based on a background level determined for the document. The designation of black as ON and white as OFF simply reflects the fact that most documents of interest have a black foreground and a white background. However, it is to be appreciated that the teachings herein are equally applicable to negative images as well.

Accumulator 24 which may beneficially comprise a plurality of pixel counters, a plurality of row summers and column summers, processors, or like devices to accumulate pixel sums, sums pixel counts for rows and columns for various rotation angles to calculate a second order moment for each of the predetermined rotation angles. For each binarized scanline of image data received, accumulator 24 simultaneously samples pixel data at a plurality of document rotation angles. Second order moments are calculated as a function of document rotation angle for rows and columns by accumulator 24, yielding row and column second order moment data sets. The row and column second order moment data sets are supplied to skew angle processor 30, which processes the second order moment data sets to yield a resultant image skew angle. The operation of accumulator 24 and skew angle processor 30 are described more fully below.

An image processor 38, containing a memory 40, receives the calculated skew angle estimate and applies it to the scanned image data received from the image data memory 20. The image processor 38 corrects the skew error present in the image in accordance with the resultant skew angle estimate received from the skew angle processor 30. Skew correction involves rotating the original image stored in the image data memory 20 by the negative of the skew angle determined by the skew angle processor so as to deskew the image. Such means for rotating the image are well known, and include, for small angles of rotation (less than 5 degrees), applying two orthogonal shears. For larger skew angles, rotation can be approximated by three shears, with the first and third shear of equal magnitude in the horizontal direction and the second larger shear in the vertical direction. The deskewed digital image representation is output to image output device 50 which may comprise an electrostatographic (e.g., electrophotographic, ionographic) printer; a liquid ink printer (e.g., drop-on-demand, such as piezoelectric, acoustic, phase change wax-based or thermal); an electronic display systems such as CRTs, LCDs, LED, etc.; or similar output device.

In the embodiment of FIG. 1, image output device 50 comprises a xerographic printer. In such embodiment, the digital image representation is transferred to an image processing controller 52. In a conventional xerographic device, a charge retentive surface in the form of photoreceptor belt is charged to a substantially uniform potential. The belt then travels through an exposure station 54 which, in response to image data, generates modulated light beam that illuminates portions of the belt causing the charge retentive surface to be discharged so as to create an electrostatic latent image. After receiving an electrostatic latent image, the exposed image area passes through a developer station 56 at which toner is placed on the latent image using commonly known techniques. After station 56, a sheet is brought into contact with the surface of belt wherein the toner image is transferred to the sheet. After transfer, the sheet is advanced to fuser station 58 wherein the toner is permanently affixed to the sheet to produce a hard copy 60 of the scanned image.

Figure 2:
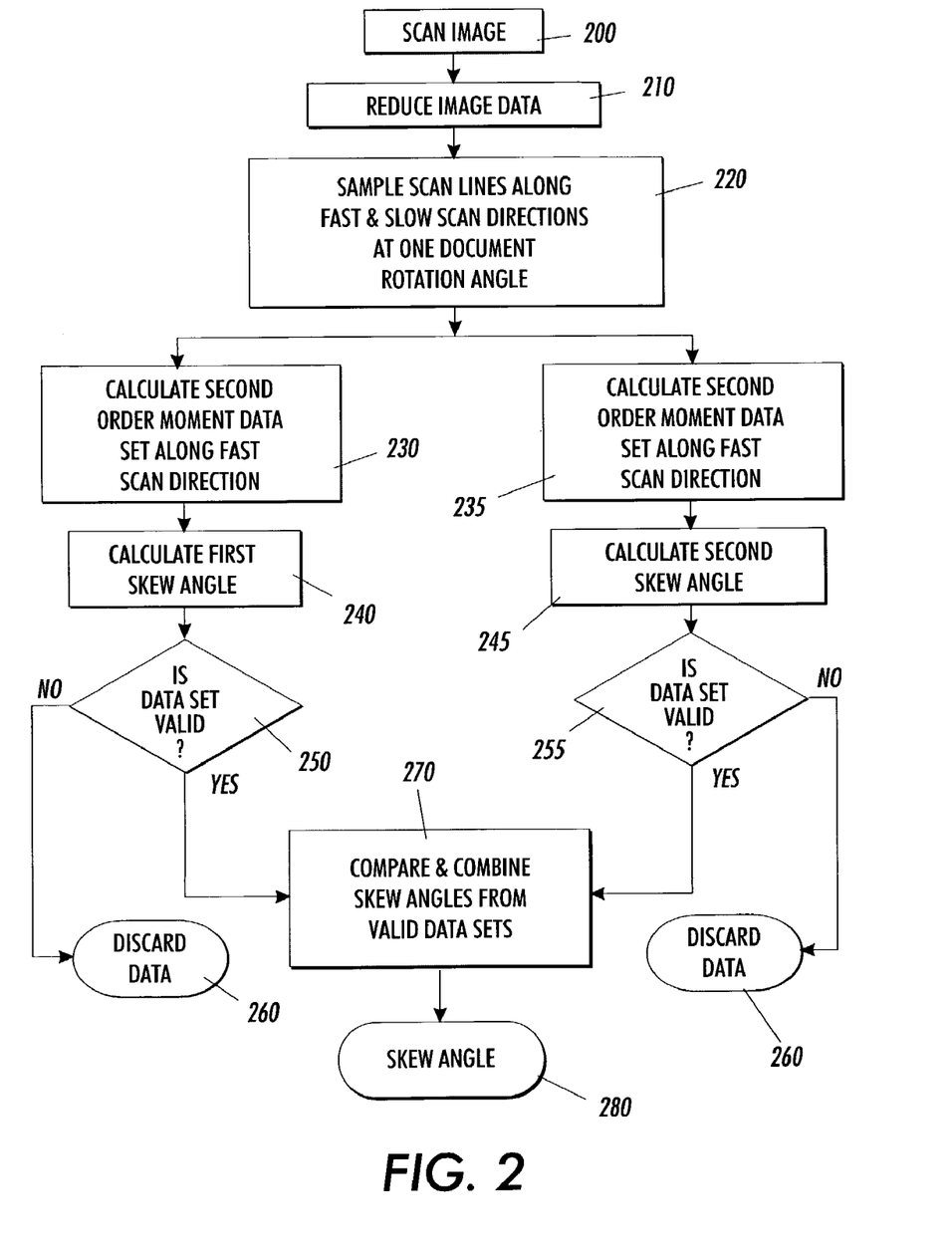
FIG. 2 is a flow chart illustrating a an embodiment of method of determining image skew.

Turning now to FIG. 2, there is shown a flowchart of an embodiment of a method of determining image skew of a scanned document. In accordance with the teachings herein, image skew is determined by calculating the second order projected moment in both the fast scan and slow scan direction for several predetermined rotation angles in parallel. The moments are calculated by first summing the pixel values along a projected line in the image for each rotation angle, where the projected line pitch is a function of the rotation angle. Then, for each angle, the projected line sums are squared and added together to form a single metric.

The embodiment of FIG. 2, a document is scanned 200 in a conventional manner, to obtain one or more scanlines of image data. Optionally, the resolution of image data is reduced 210 so as to accelerate the process. Any number of conventional techniques can be employed to reduce the image data resolution. For example, the source image data can grouped into blocks of pixels with each such block being mapped to a single pixel on the destination image. The value for the destination image pixel may be determined by counting the ON pixels within the block. If the number of ON pixels in the block is greater than or equal to a threshold, the destination pixel is considered to be ON, otherwise it is considered to be OFF. Alternatively, the data may be reduced by sub-sampling such that every $n^{th}$ scanline and/or pixel is considered.

Row and columns of image data are sampled 220 along two directions, i.e., the fast scan and slow scan directions, at one or more predetermined document rotation angle(s) in order to determined the number of ON pixels per row or column. More particularly, within a given scanline of image data, for each pixel position within that scanline, the pixel position's rotated location is calculated for all predetermined document rotation angles simultaneously and the corresponding row and column sums are updated. In other words, as each pixel is read, its location is calculated simultaneously for each document rotation angle to be sampled as if the scanline were rotated and the corresponding row and column sum for the calculated pixel location are updated at that time. This process is described more fully with reference to FIG. 3.

Figure 3:
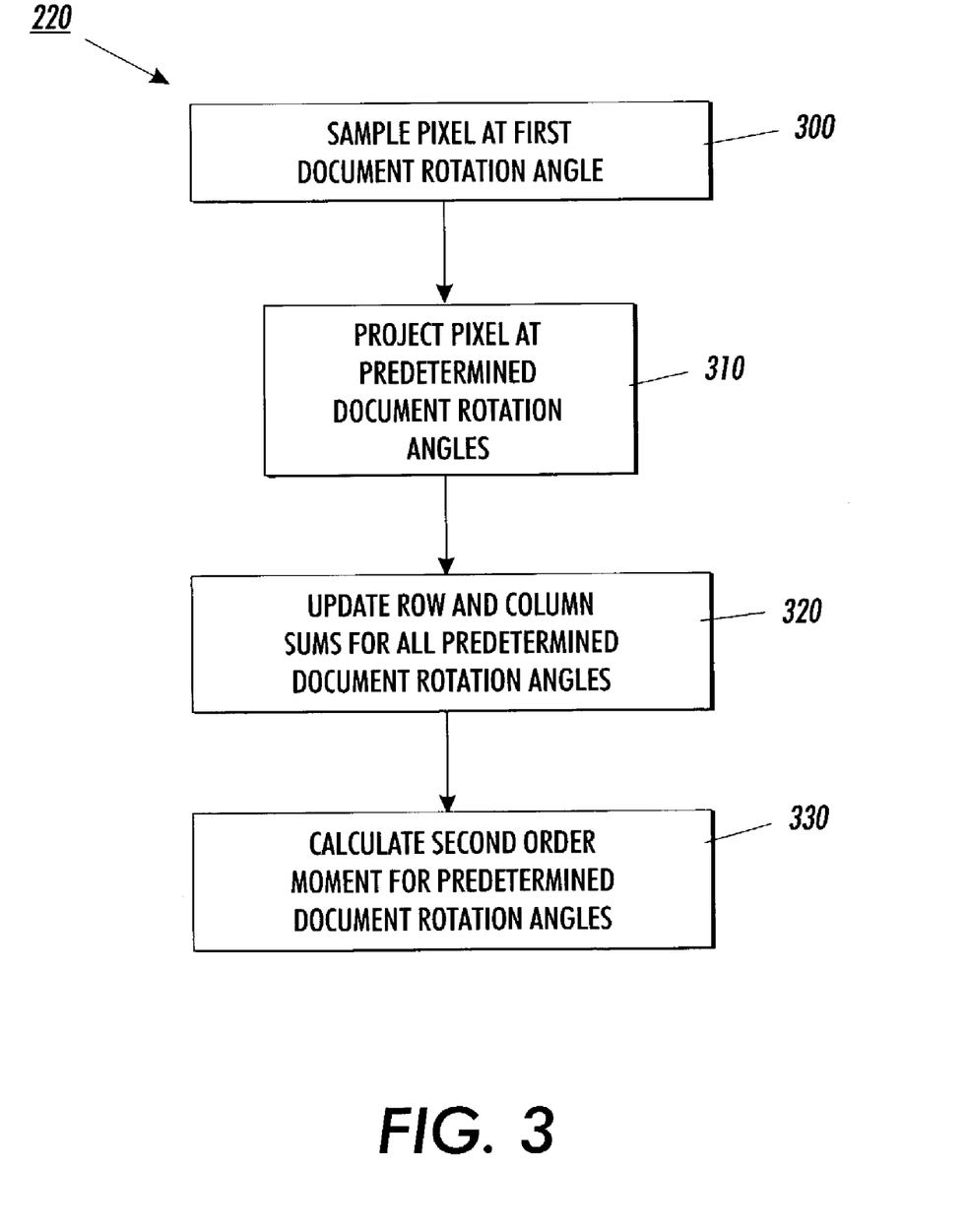
FIG. 3 is a flow chart illustrating an embodiment of a method for simultaneously sampling pixel data at a plurality of document rotation angles.

Turning now to FIG. 3, a scanline of image data is received and pixels within the scanline are sampled or read 300, that is, determined to be either ON or OFF. Each pixel within the scanline is then projected along a plurality of predetermined document rotation angles 310 and location of each such projected pixel is determined. Based on the projected pixel locations for each document rotation angle, the corresponding row and column sums are updated 320 simultaneously. As is explained more fully below, the second order moments of the ON pixels are calculated for each predetermined document rotation angle based on the updated row and column sums. The process of steps 300 through 320 is repeated for a plurality of scanlines of image data across the scanned document. It should be appreciated that, although step 310 is described as projecting each pixel within a scanline along a plurality of predetermined document rotation angles, the process can be employed to project only a subset of the pixels within the scanline.

Figure 4:
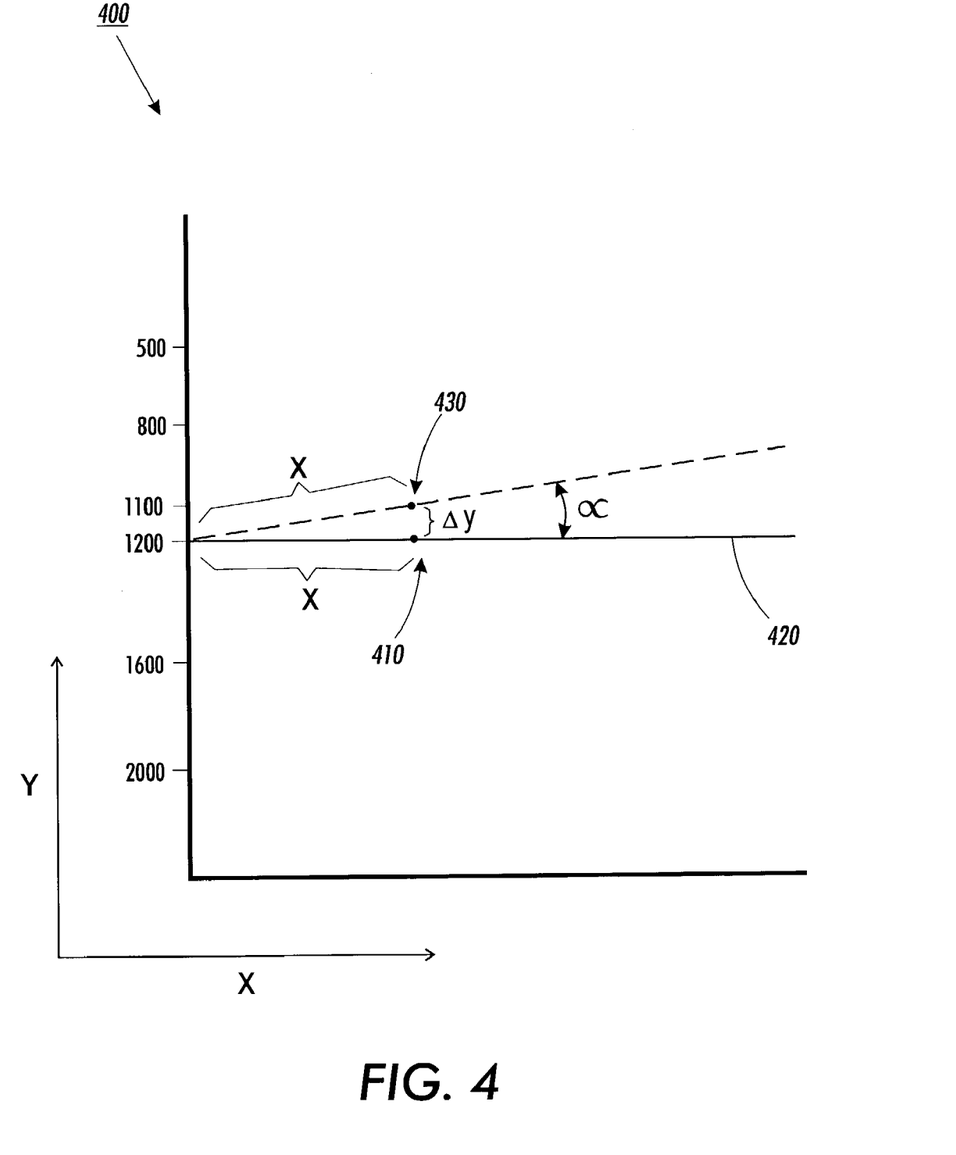
FIGS. 4 and 5 illustrate the projection of a pixel along a document rotation angle.
Figure 5:
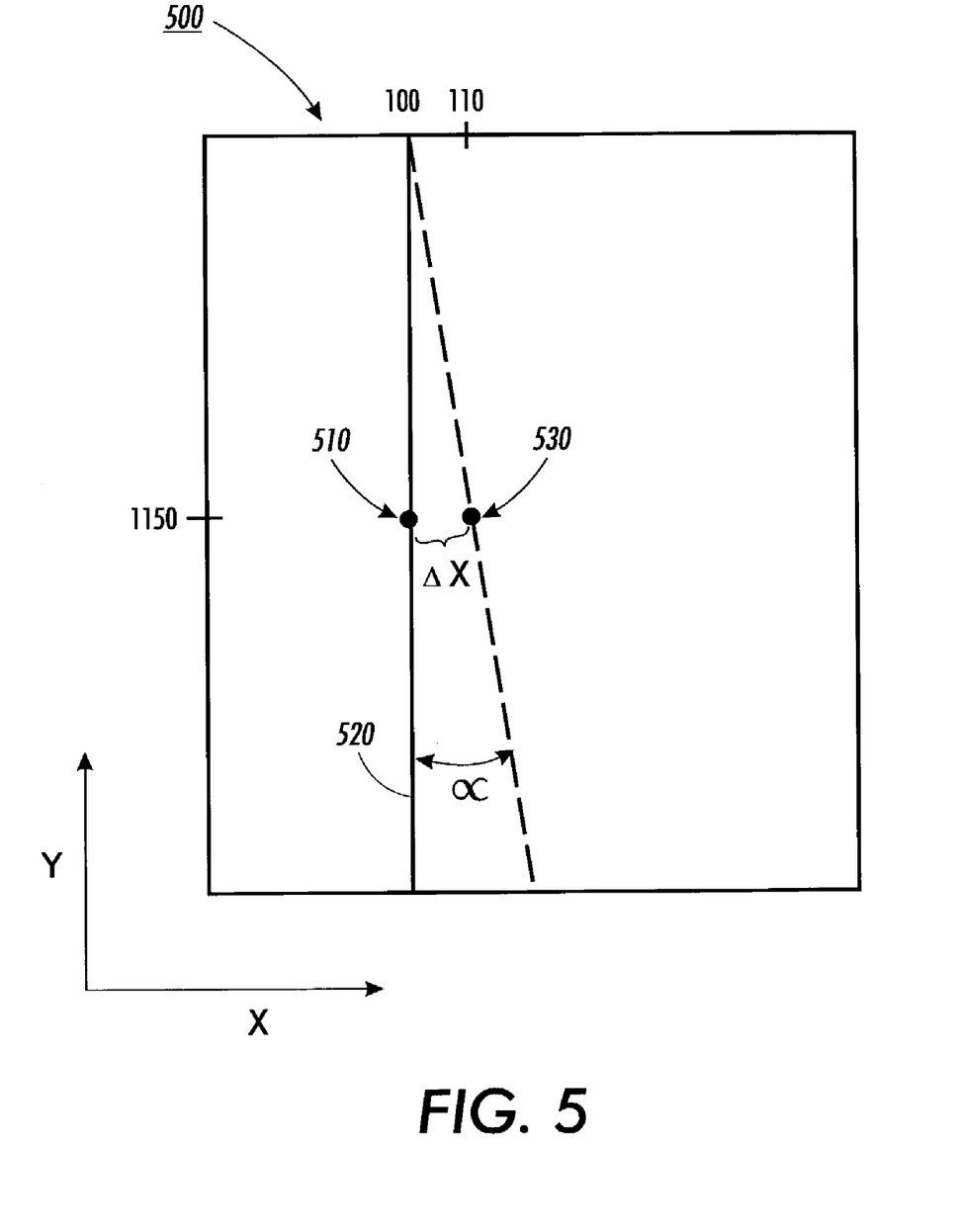

The pixel sample, rotation and the row/column sum process can be illustrated with addition reference to FIGS. 4 and 5. Referring to FIG. 4, there is illustrated a document 400 having a plurality of rows. At a given document rotation angle of zero miliradians, a particular pixel 410, which is determined to be ON, is located in a given column (pixel position) at a certain x value along row 1200 420. Pixel 410 is counted and added to the row sum of the number of ON pixels for row 1200 420 for document rotation angle of zero miliradians. However, for a different document rotation angle, e.g., $\alpha=1$ miliradian, the pixel at position 410 would move to pixel position (column) 430 on scanline 1100. It is to be appreciated that projected pixel position 430 is calculated to fall on scanline 1100 by the formula $\Delta y = x\alpha$. This relationship holds true because $\tan \alpha \approx \alpha$ for small alphas. Therefore, as each pixel is read for an initial document rotation angle, the row onto which it would be projected is calculated and the subsequent pixel count is updated for each predetermined document rotation angles to be sampled as the pixel is read.

Similarly, referring to FIG. 5, there is illustrated a document 500 having a plurality of columns. At a given document rotation angle of zero miliradians, a particular pixel 510, which is determined to be ON, is located in a given position or row (e.g., row 1150) along column 520 corresponding to column 100. Pixel 510 is counted and added to the column sum for the column 100 for document rotation angle of zero miliradians. At a document rotation angle $\alpha$, the pixel at position 510 along column 100 would project onto pixel position 530 which occurs along the same row 1150 but on column 110. Here again, it should be readily apparent that projected pixel position 530 can be obtained by the $\Delta x = y\alpha$.

From the above, it should be appreciated the projected position of any pixel position along a row or column can be readily determined as a function of the rotation angle and the row or column in which the pixel resides. That is, the row y onto which any pixel x along a given row $y_0$ at rotation angle $\alpha$ will project is given by $y = x\alpha + y_0$. Similarly, the column x onto which any pixel y along a given column $x_0$ at rotation angle $\alpha$ will project is given by $x = y\alpha + x_0$. As an alternative to repeatedly calculating the projected pixel position, the projected pixel position for any rotation angle can be defined by its offset in the row (y) or column (x) direction. As the projected lines tend to cross a small number of row or columns given the number of pixels per row or column, the pixel offset values will be constant over a significant number of pixels allowing for compact storage of the offset values. Furthermore, as the pixel offset values simply increase one row or column at a time, the system need only identify those pixels along the row or column at which the projected pixel position shifts (is offset) to the next row or column. In such an embodiment, when updating the row or column sums, the method need only track (count) the pixels and shift the row or column sum to update at the appropriate time.

Referring back to FIG. 2, a second order moment data set is calculated 230 for scanlines along the fast scan direction. In other words, the second order moment data set includes calculated second order moments as a function of document rotation angle. The second order moment is the mean value of the sum of the square of the number of ON pixels on each row for a given document rotation angle. More particularly, the second order moment is calculated by an equation of the form:

$$\sum_{i=1}^{N} (n_i)^2 \qquad (1)$$

where N is the number of rows (scanlines) along the fast scan direction, n is the number of ON pixels in a scanline; and i is a counter for the scanlines along the fast scan direction. Stated differently, for a given document rotation angle, the second order moment is calculated by summing the number of ON pixels across each scanline or row, squaring that sum, and summing over all of the scanlines. While the second order moment is the preferred metric for determining skew angle, it is to be appreciated that other metrics may be employed, such as the square of the difference between sums of ON pixels on adjacent scanlines or the variance.

The same process is employed to calculate a second order moment data set along the slow scan direction 235 by performing the above-described operation, only summing along columns rather than rows. In other words, in order to calculate the second order moment data set along the slow scan direction, the number of ON pixels along scan columns are calculated by an equation of the form:

$$\sum_{j=1}^{M} (m_j)^2 \quad (2)$$

where M is the number of columns (pixels per scanline) along the slow scan direction, m is the number of ON pixels in a column, and j is a counter for the columns along the slow scan direction.

From the fast scan and slow scan second order moment data sets, first and second skew angles are calculated 240, 245. Each skew angle estimate 240, 245 is passed through a validation process 250, 255, where invalid data sets are discarded 260 and valid data sets are passed on to a compare and combine step 270, which ultimately yields a resultant skew angle estimate 280.

Figure 6:
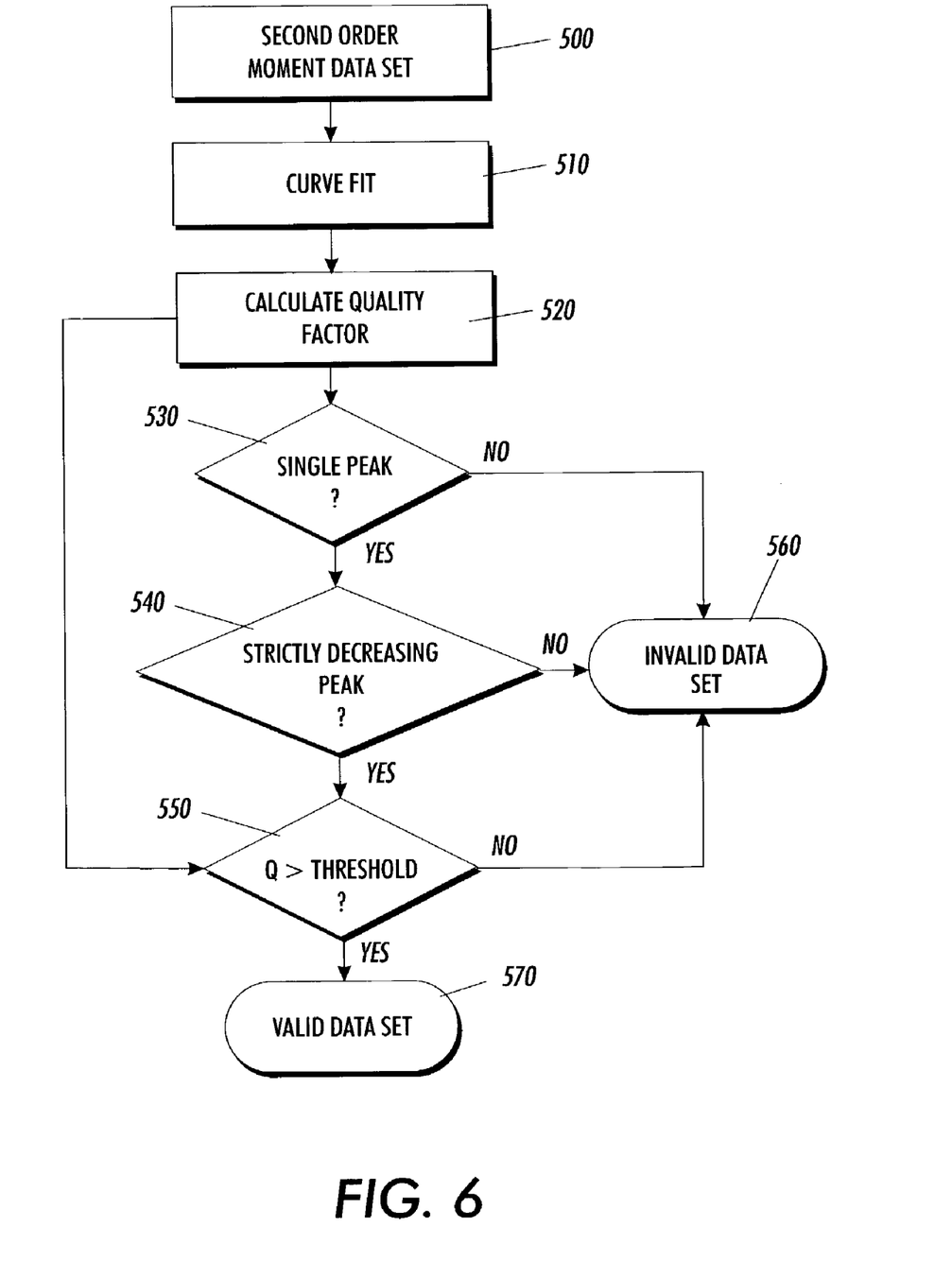
FIG. 6 is a flow chart illustrating an embodiment of a method of validating a second order moment data set.

More particularly, with reference to FIG. 6, each second order moment data set 600 is subject to a curve fit analysis 610 in order to calculate the corresponding skew angle. More particularly, each second order moment data set is fit with an equation of the form:

$$S_\alpha = S_{\alpha max} - k|\alpha - \alpha_{max}| \quad (3)$$

where $S_{\alpha max}$ is the maximum second order moment value, and $\alpha_{max}$ is the document rotation angle at which $S_{\alpha max}$ occurs. From this fit, the document rotation angle at which the second order moment is substantially a maximum is computed for both the fast scan and slow scan second order moment data sets. In other words, the document rotation angle at which the maximum second order moment occurs is the skew angle estimate.

In order to determine whether the particular second order moment data set is valid, at least one quality factor or q-factor is calculated 620. More particularly, from equation (3), a local quality factor, $Q_{loc}$, is calculated according to the following equation:

$$Q_{loc} = k = \frac{S_\alpha - S_{\alpha max}}{|\alpha - \alpha_{max}|} \quad (4)$$

$Q_{loc}$ is equivalent to the slope of the equation fit to the particular second order moment data set at the local maximum. In addition, a global quality factor, $Q_{Global}$, is calculated according to the following equation:

$$Q_{Global} = \frac{(S_{\alpha max} - S_{\alpha min})}{S_{\alpha max}} \quad (5)$$

where $S_{\alpha min}$ is the minimum second order moment value, and $\alpha_{min}$ is the document rotation angle at which $S_{\alpha min}$ occurs. It is to be appreciated that $Q_{loc}$ and $Q_{Global}$ are indicators of the strength and integrity of both the fast scan and slow scan second order moment data sets.

The calculated quality factors are used in a number of validation or verification steps described below. The first validation step includes verifying whether each second order moment data set includes a single dominant peak or multiple peaks 630. In one embodiment, a predetermined peak-to-valley threshold is employed to determine the number of dominant peaks present in the second order moment data set. However, it is to be appreciated that other conventional methods are contemplated. If multiple peaks are present, the data set is determined to be invalid 660. Assuming a single dominant peak, a peak purity test is performed in which it is determined whether the function is strictly decreasing near the dominant peak 640. If a strictly decreasing peak is not present, such as where a side node exists adjacent the dominant peak, the data set is declared to be invalid 660. Conversely, if the single peak is considered to be strictly decreasing, the q-factor or quality factor associated with the peak is compared 650 to a predetermined threshold value. If the q-factor does not meet the predetermined threshold, the data set is considered to be invalid and the corresponding skew angle estimate is not used in further processing. However, if the q-factor is determined to be greater than the threshold, the data set is considered to be valid 670 and the corresponding skew angle estimate is passed on to the compare and combine step 270.

Figure 7:
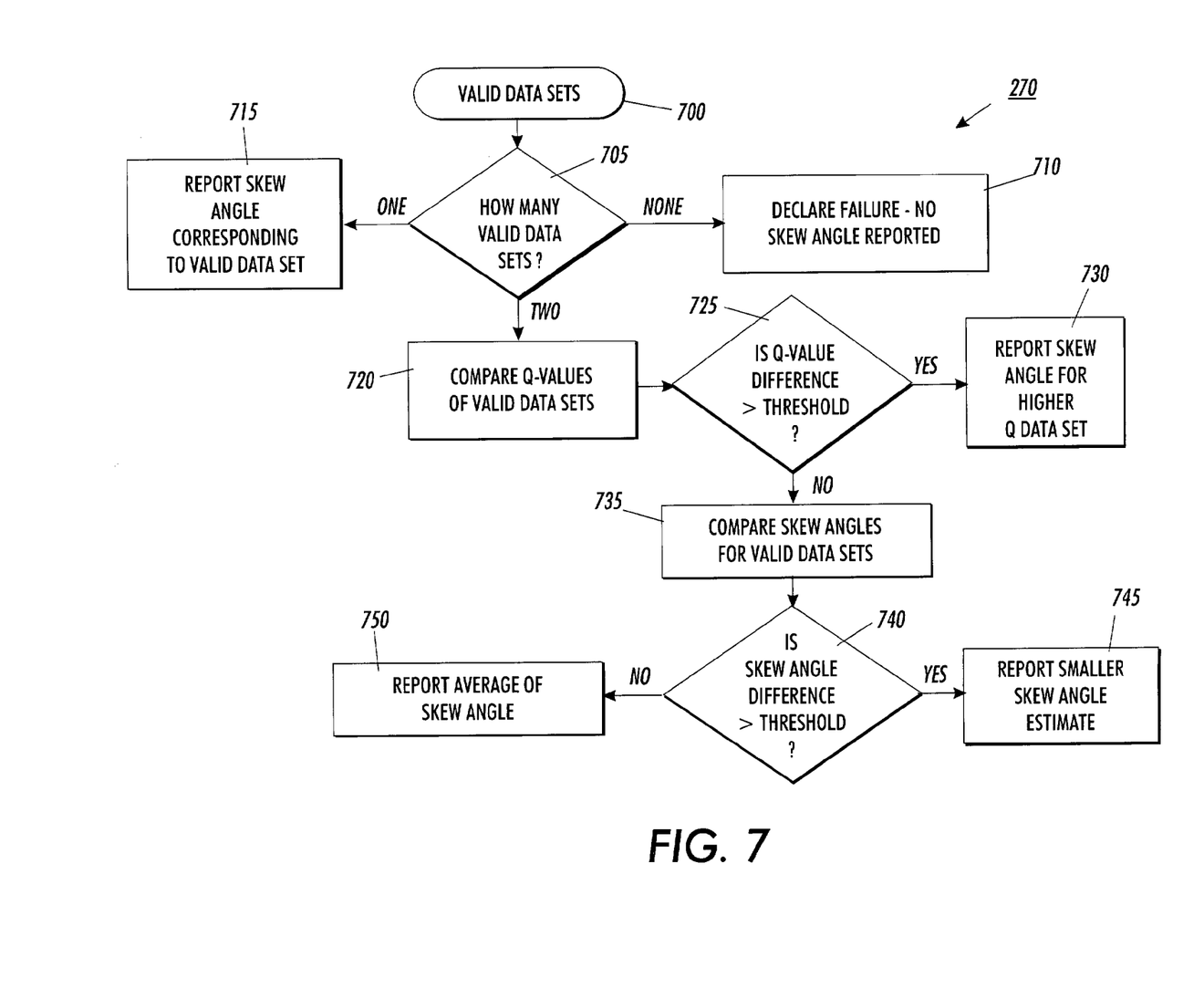
FIG. 7 is a flow chart illustrating an embodiment of a method for combining skew angle estimates from valid data sets.

Referring FIG. 7, a method of comparing and combining 270 skew angles from valid data sets 700 is illustrated. First, the number of valid data sets is determined 705. If no valid data sets exist, failure is declared 710 and no skew angle is reported. It is to be appreciated that this condition may be present in document images containing extraordinarily large quantities of text and/or numerous varied dominant orientations of text. If one valid data set is present, the skew angle corresponding to the valid data set is reported 715 as the resultant skew angle for the particular image.

In the case of two valid data sets, the corresponding q-factors, $Q_{Global}$ and/or $Q_{loc}$, for each valid data set are compared 720 to one another. It is determined whether or not the difference between the q-factors of the two data sets is greater than a predetermined threshold 725. It is to be appreciated that both local and global q-factors may be considered in this determination. If the q-factor differences are greater than the predetermined thresholds, the skew angle corresponding to the data set having a higher q-factor is reported 730 as the skew angle for the image. This state is characterized as a single dominant data set, that is, a state where one data set has a significantly higher q-factor than the other. If the difference between the respective q-factors is less than the predetermined threshold, the skew angles for both data sets are compared 730. Namely, it is determined whether the difference in skew angles is greater than a predetermined threshold 740. If the skew angle difference is less than the predetermined threshold, the average of the two skew angles is reported 750 as the resultant skew angle for the image. In this case, it is to be appreciated that shear may be reported as well, where the shear is equivalent to the angle difference between the two skew angle estimates. However, if the difference between the first and second skew angles is greater than the predetermined threshold, the smaller skew angle estimate is reported 745. It is to be appreciated that reporting the smaller skew angle estimate provides an additional safeguard in an effort to avoid overcorrection or over-manipulation of the document image.

In one embodiment, accumulator 24 of FIG. 1 employs one memory location to store each row sum for each document rotation angle. However, to implement such an embodiment wherein each of the for A rotation angles over N scanlines requires over (A×N) memory locations to store the projected row sums. However, it should be appreciated that at any one time, only a small subset of the memory locations are being accessed. Thus, while it is possible to implement an embodiment with such a memory requirement, it is not a particularly efficient use of memory resources.

In an embodiment of an image skew determination method as described herein where the image is received in scanline order, the pixels in each incoming scanline will project over a small number of rows. In particular, for each document angle, it is possible to calculate the number of rows P into which each incoming scanline will project. For an angle $\alpha$ expressed in radians, the number of row sums a scanline can project onto, $P_\alpha$, is approximately $(\alpha M)+1$, where M is the number of pixels per scanline. At the end of each processed scanline, the memory holds the sum for one complete projected line plus partial sums next $(P_\alpha-1)$ lines. In other words, there is one memory location that will not be written to by subsequent scanlines. This projected row sum is complete, and can be squared and accumulated into a running sum of squares calculation. The memory holding the completed row (one for each angle) may be freed for a new row sum onto which the subsequent scanline will project.

More specifically, if the projected scanline crosses 100 rows, only 100 memory locations will be needed to store the sums for that angle. Each incoming pixel would map to one of the 100 rows and increment the corresponding memory locations. For each new scanline received, one projected scanline would be completed and the square of the row sum is calculated and accumulated. The corresponding memory location would be freed for the new scanline. To calculate the sums for an angle of 0°, the projected scanlines are identical to the incoming scanlines. A single memory register may be used to contain the sum.

Figure 8:
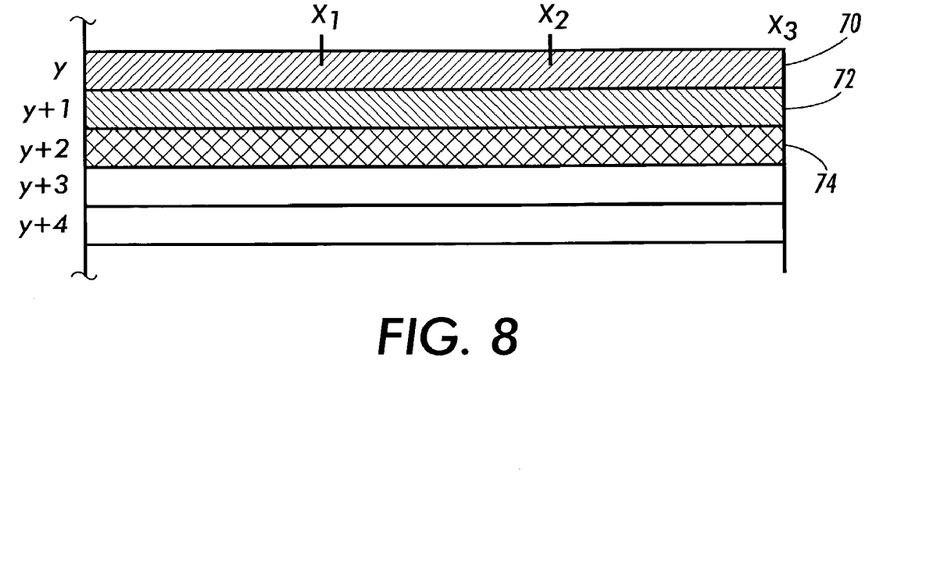
FIGS. 8 and 9 illustrate an embodiment of obtaining row sums for selected document rotation angles in accordance with the teachings herein.
Figure 9:
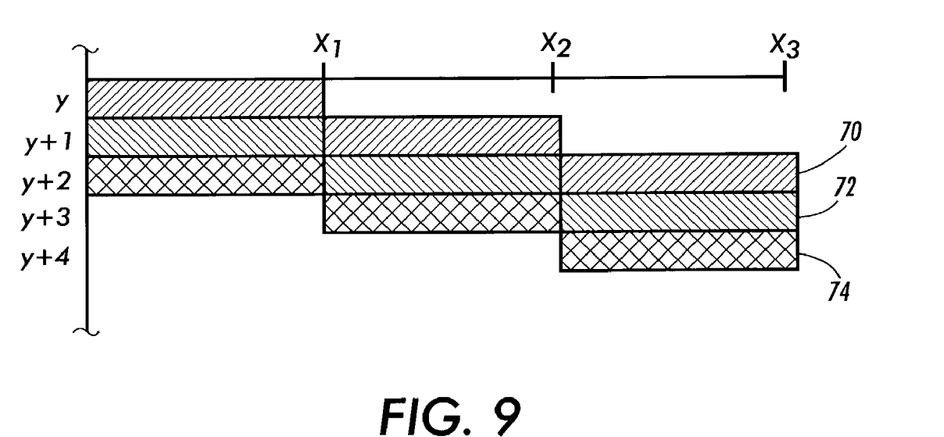

The above process can be illustrated by way of example with reference to FIGS. 8 and 9 where there are shown the projections of a plurality of scanlines, at rotations of 0° and $\alpha$, respectively. In particular, FIG. 8 shows three scanlines 70, 72 and 74 at 0° rotation projected onto rows y, y+1, and y+2, respectively. The projected row sum for 0° rotation angle is simply the sum of the ON pixels in row y. Similarly, the projected row sums for 0° for rows y+1 and y+2, is simply the sum of the ON pixels in scanlines 72 and 74, respectively. FIG. 9 shows the projection of the three scanlines 70, 72 and 74 at document rotation angle $\alpha$. As can be seen from FIG. 9, the projected row sum for row y at angle $\alpha$ is the number of ON pixels in the set of pixels $1-X_1$ of scanline 70. The projected row sum for row y+1 at angle $\alpha$ is the number of ON pixels in pixels $1-X_1$ of scanline 72 plus the number of ON pixels in the set of pixels $X_1-X_2$ of scanline 70. Similarly, the projected row sum for row y+2 is the number of ON pixels in pixels $1-X_1$ of scanline 74 plus the number of ON pixels in pixels $X_1-X_2$ of scanline 72 plus number of ON pixels within pixels $X_2-X_3$ of scanline 70.

In accordance with the reduced memory requirements described above, only four memory locations $(L_0-L_3)$ are required to accumulate the row sums for rows y, y+1, and y+2 for document rotations of 0° and $\alpha$. When scanline 70 is received, pixels $1-X_3$ are summed and stored in memory $L_0$. In parallel, scanline 70 is rotated to angle $\alpha$ and the number of ON within pixel sets $1-X_1$, $X_1-X_2$, and $X_2-X_3$ of scanline 70 are added to memory locations $L_1$, $L_2$, and $L_3$, respectively. At this point in processing, memory locations $L_0$ and $L_1$ hold the projected row sums for row y for angles 0° and $\alpha$, and locations $L_2$ and $L_3$ hold the partial projected row sums for angle $\alpha$ for rows y+1 and y+2, respectively. The sums accumulated in memory locations $L_0$ and $L_1$ are squared and accumulated to second order moment for angles 0° and $\alpha$, respectively. Memory locations $L_0$ and $L_1$ are then cleared and freed for use to begin to accumulate new row sums upon receipt of the next scanline.

Next, scanline 72 is received and, in accordance with the rotation to angles 0° and $\alpha$, the number of ON pixels within scanline is added to memory location $L_0$ and becomes the row sum for row y+1 for angle 0°. In parallel the number of ON within pixel sets $1-X_1$, $X_1-X_2$, and $X_2-X_3$ of scanline 72 are added to memory locations $L_2$, $L_3$, and $L_1$, respectively. At this point in processing, the projected row sums for row y+1 for angles 0° and $\alpha$ are completed and held in memory locations $L_0$ and $L_2$, respectively. Locations $L_3$ and $L_1$ hold the partial row sums for rows y+2 and y+3, respectively. The row sums in $L_0$ and $L_2$ are squared and accumulated to second order moment for angles 0° and $\alpha$, respectively. Memory locations $L_0$ and $L_2$ are then freed for use to begin to accumulate new row sums upon receipt of the next scanline.

Scanline 74 is then received and rotated to angles 0° and $\alpha$. The number of ON pixels within scanline 74 is added to memory location $L_0$ and becomes the row sum for row y+2 for angle 0°. In parallel the number of ON within pixel sets $1-X_1$, $X_1-X_2$, and $X_2-X_3$ of scanline 74 are added to memory locations $L_3$, $L_1$, and $L_2$, respectively. At this point in processing, locations $L_0$ and $L_3$ hold the projected row sums for row y+2 for angles 0° and $\alpha$, and $L_1$ and $L_2$ hold the partial row sums for rows y+3 and y+4, respectively. The projected row sums accumulated in memory locations $L_0$ and $L_3$ are squared and accumulated to second order moment for angles 0° and $\alpha$, respectively. Memory locations $L_0$ and $L_3$ are then cleared and freed for use upon receipt of the next scanline.

As should be appreciated, this above described approach significantly decreases the required memory to implement the algorithm. For hardware implementations, such as in an ASIC or FPGA, the entire memory required for A rotation angles over N scanlines may be implemented internal to the device. Using the original approach, an external memory device would be required to implementing the algorithm. For a software implementation, reducing the required memory may allow all accesses to be from cache instead of needing to access main memory. This would greatly increase the speed of execution.

In the embodiment of determining image skew of a scanned document described above with reference to FIG. 2, image skew is determined by calculating the second order projected moment in both the fast scan and slow scan direction for several predetermined rotation angles in parallel. In calculating the second order projected moment in both the and slow scan direction, each pixel is projected onto a given column sum for each of the angles being considered. Thus, for every pixel processed each rotation angle requires a memory location to be incremented. The incremented memory location corresponds to the column the pixel would be projected into for that rotation angle. A memory increment requires 2 memory access operations: one read and one write; thus, for every scanline, this results in 2*A*M memory access, where A is the number of skew angles metrics being determined and M is the number of pixels per scanline. This update could either be done using 2*A memory accesses per pixel, or by doing 2*A*M memory accesses in the interline gap.

The bandwidth requirements make performance in real time an intractable problem when using currently available external memory devices as an external memory component precludes parallel accesses to the memory. Thus, the high bandwidth cannot be supported. The solution requires either the use of on chip cache for software solutions, or onchip memory for a dedicated hardware solution. For software implementations, the memory size required to hold the column sums may prevent it all being held in cache. When implementing the algorithm in hardware, such as an FPGA or ASIC, the size of the memory requires use of an external memory component, due to the size of the column sums. If the memory could be implemented in internal memory, the memory accesses could be done in parallel by implementing multiport memories and by using multiple small memories.

One approach to address this limitation is to use partial parallelism to perform the task. Using partial parallelization, it is possible to operate on several scanlines at once. Assuming the images are received a row at a time, the algorithm to calculate the column sums may be implemented over a "band" of rows. The updates of the external memory that contain the column sums are done only once per band of rows instead of every row. It is assumed that the band is sufficiently small to allow it to be held in cache for software implementations or in internal memory for hardware implementations. When a band of B rows are received, the projected column sums may be calculated for the B rows; shifted versions of the rows are summed together and the resulting partial sum is then used to update the external memory. Each angle still requires 2*A*M (actually, 2*A* (M+1)) updates, but updates now consist of adding a number between 0 and B to every projected sum location for each angle. This is in contrast of the previous update strategy of just possibly incrementing a memory location; the width of the number added has been increased in exchange for a greatly reduced bandwidth. Here again, the total number of memory accesses for the B rows will be 2*A*(M+1). However, the total memory accesses, and thus bandwitdth, to the "column sum" memory has been reduced by nearly a factor of B.

The cache requirements of the system have increased; previously only 1 scanline needed to be in memory. The implementation described above requires the use of B scanlines of memory in cache. The greater the number of scanlines B within the band, the faster the algorithm will run at the cost of "cache/internal" memory. Where the image is being received a row at a time, the algorithm need run only as fast as the data is being received and the buffer. Thus, B should be minimized to match the speed of the incoming data. However, it should be appreciated that additional memory is required to receive the next B band of rows while the current band of B rows are being processed. Thus, the above process would require 2*B*M pixels of cache or internal storage.

An alternate solution employs only one additional line of buffering. With a band of B complete lines available, the may be processed one angle at a time. However, instead of updating all A angles during the time it takes to receive the B scanlines (as discussed above), only A/B angles are updated in the time it takes for the new row to be received. That is, only the column sums for certain set of rotation angles are updated as each scanline is received, but after every B scanlines the column sums for all the rotation angles have been updated once. It should be appreciated that this process is analogous to the concept of time division multiplexing.

More specifically, as each new row (scanline) is received, the newly received row is "rotated" into the band and the oldest row in the band is freed to accept the next incoming row. As the incoming row is being received, the next set of A/B angles is processed and updated. In the time B rows are received, all A angles have been processed. That is, the above algorithm comprises three steps: (a) obtaining a new scanline of image data, (b) updating columns sums for a set of rotation angles using scanlines of image data within a buffer comprising a band of scanlines, and (c) updating the buffer with the newly obtained scanline using a first in, first out priority. Beneficially, the steps of obtaining a new scanline and updating column sums are performed in parallel. The total memory required is reduced to (B+1)*M pixels of cache, instead of 2*B*M slots, with no increase in external memory bandwidth requirements.

One embodiment of the above process is illustrated with reference to Table (1). As scanline 4 is obtained, the column sums for the rotation angles within angle set 1 are updated using the image data within the buffer (scanlines 1 through 3). After row 4 has been obtained and the column sums for angle set 1 have been updated, the buffer is updated in a first in, first out priority to rotate scanline 4 into the buffer and push out scanline 1. Similarly, as scanline 5 is being obtained, the column sums for the rotation angles within angle set 2 are updated using the scanlines within buffer (scanlines 2 through 4). After row 5 has been obtained, the buffer is updated to rotate in scanline 5 and rotate out scanline 2. This process can be repeated through the scan of the document.

TABLE 1

| Buffer | Incoming Row | Angle Set 1 | Angle Set 2 | Angle Set 3 |
|---|---|---|---|---|
| rows 1–3 | 4 | update column sums with rows 1–3 | | |
| rows 2–4 | 5 | | update column sums with rows 2–4 | |
| rows 3–5 | 6 | | | update column sums with rows 3–5 |
| rows 4–6 | 7 | update column sums with rows 4–5 | | |
| rows 5–7 | 8 | | update column sums with rows 5–7 | |

What has thus been described is a memory efficient method for calculating the fast scan second order moments required to compute the skew of an image. There has also been described a method to reduce the number of memory accesses needed when calculating the slow scan second order moments employed in a method to compute skew of a scanned an image.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of processing scanned image data comprising:
receiving image data, the image data comprising a plurality of scanlines with each scanline comprising a plurality of pixels;
generating a fast scan second order moment data set;
generating a slow scan second order moment data set; and
determining a document skew angle from the fast scan and slow scan second order moment data sets;
wherein the step of generating the slow scan second order moment data set includes
receiving a current scanline of image data,
updating columns sums for a set of rotation angles using scanlines within a buffer comprising a band of scanlines, the band having a predetermined number B of scanlines, and
updating the buffer with the current scanline.

2. The method of claim 1, wherein the step of updating the buffer uses a first in, first out priority.

3. The method of claim 1, wherein the step of updating columns sums for a set of rotation angles is performed in parallel with the step of receiving a current scanline.

4. The method of claim 1, wherein the step of updating columns sums for a set of rotation angles comprises:
for each scanline within the buffer, projecting pixels from the scanline onto columns in accordance with at least a first document rotation angle; and
for each column within a first set of columns, adding the number of ON pixels projected onto the column resulting from of the projection to the first document rotation angle to a column sum for the column.

5. The method of claim 1, wherein the step of generating the slow scan second order moment data set further comprises:
receiving a subsequent scanline,
updating columns sums for a second set of rotation angles using scanlines within the buffer, and
updating the buffer with the subsequent scanline using a first in, first out basis.

6. The method of claim 1, wherein the slow scan second order moment data set includes a second order moment for each rotation angle in a set having X unique rotation angles and the step of updating columns sums for a set of rotation angles updates the column sums for each of the X unique rotation angles.

7. The method of claim 1, wherein the slow scan second order moment data set includes a second order moment for each rotation angle in a set having X unique rotation angles and the step of updating columns sums for a set of rotation angles updates the column sums for X/B rotation angles.

8. The method of claim 1, wherein the step of wherein the step of generating the fast scan second order moment data set comprises:
projecting a plurality of pixels within the current scanline to a first rotation angle;
adding a first subset of the plurality of projected pixels to a first memory location;
adding a second subset of the plurality of projected pixels to a second memory location;
adding a third subset of the plurality of projected pixels to a third memory location; and
adding the square of the pixel sum in the first memory location to a moment accumulator.

9. The method of claim 8, wherein the step of generating the fast scan second order moment data set further comprises:
projecting a plurality of pixels within a subsequent scanline to the first rotation angle;
adding a first subset of the plurality of projected pixels within the subsequent scanline to the second memory location;
adding a second subset of the plurality of projected pixels within the subsequent scanline to the third memory location;
adding a third subset of the plurality of projected pixels within the subsequent scanline to the first memory location, and
adding the square of the pixel sum in the second memory location to the moment accumulator.

10. A method of processing image data comprising:
scanning a document to produce scanned image data comprising a plurality of scanlines, each scanline having a plurality of pixels;
generating a first set of second order moments, the first set of second order moments being based on row sums;
generating a second set of second order moments, the second set of second order moments being based on column sums; and
determining a document skew angle from the first and second sets of second order moments;
wherein the step of generating the first set of second order moments includes receiving a first scanline,
projecting a plurality of pixels within the first scanline to at least a first rotation angle,
adding a first subset of the plurality of projected pixels to a first memory location,
adding a second subset of the plurality of projected pixels to a second memory location,
adding a third subset of the plurality of projected pixels to a third memory location, and
adding the square of the pixel sum in the first memory location to a moment accumulator.

11. The method of claim 10, wherein the step of generating the fast scan second order moment data set further comprises adding a fourth subset of the plurality of projected pixels to a fourth memory location.

12. The method of claim 10, wherein the step of generating the first set of second order moments further includes:
receiving a second scanline;
projecting a plurality of pixels within the second scanline to the first rotation angle;
adding a first subset of the plurality of projected pixels within the second scanline to the second memory location;
adding a second subset of the plurality of projected pixels within the second scanline to the third memory location;
adding a third subset of the plurality of projected pixels within the second scanline to the first memory location, and
adding the square of the pixel sum in the second memory location to the moment accumulator.

13. The method of claim 10, wherein the step of generating the second set of second order moments includes:
updating columns sums for a set of rotation angles using scanlines within a buffer comprising a band of scanlines, the band having a predetermined number B of scanlines, and updating the buffer with the first scanline according to a first in, first out priority.

14. The method of claim 13, wherein the step of generating the second set of second order moments further comprises:
    updating columns sums for a second set of rotation angles using scanlines within the buffer, and
    updating the buffer with the second scanline.

15. A memory efficient method of processing image data to determine image skew, comprising:
    receiving scanned image data, the scanned image data comprising a plurality of scanlines with each scanline comprising a plurality of pixels;
    generating a fast scan second order moment data set;
    generating a slow scan second order moment data set; and
    determining a document skew angle from the fast scan and slow scan second order moment data sets;
    wherein the step of generating the fast scan second order moment data set includes
        projecting a plurality of pixels within a scanline to at least a first rotation angle wherein the plurality pixels project onto M rows;
        updating M memory locations, wherein each one of the M memory locations corresponds to one of the M rows and wherein each memory location is updated using pixels projecting onto the corresponding row whereby one of the memory locations contains a completed row sum and M−1 of the memory locations contain partial row sums;
        adding the square of the completed row sum to a moment accumulator; and
        repeating the projecting, updating and adding steps for each scanline within a plurality of scanlines whereby a memory location having a completed row sum is reused to accumulate subsequent row sum so that only M memory locations are required to accumulate row sums.

16. The method of processing image data to determine image skew according to claim 15, wherein:
    the step of projecting a plurality of pixels within a scanline further comprises projecting a plurality of pixels within the scanline to each angle within a set of N rotation angles, wherein each rotation angle projects pixels onto $M_i$ rows for i=1 to N, wherein each rotation angle has $M_i$ memory locations associated therewith, and wherein each of the $M_i$ memory locations for a given rotation angle corresponds to one of the $M_i$ rows; and
    the step of updating memory locations further comprises updating the $M_i$ memory locations associated with each rotation angle.

17. The method of processing image data to determine image skew according to claim 16, wherein the step of updating memory locations, updates the $M_i$ memory locations for a given rotation angle in parallel.

* * * * *